(12) United States Patent
Lehavi et al.

(10) Patent No.: US 9,508,150 B1
(45) Date of Patent: Nov. 29, 2016

(54) POINT OF INTEREST BASED ALIGNMENT OF REPRESENTATIONS OF THREE DIMENSIONAL OBJECTS

(71) Applicant: Yowza LTD., Tel Aviv (IL)

(72) Inventors: David Lehavi, Haifa (IL); Eyal Fink, Ramat Gan (IL); Naomi Keren, Givat Shmuel (IL)

(73) Assignee: YOWZA LTD., Tel Aviv (IL)

( * ) Notice: Subject to any disclaimer, the term of this patent is extended or adjusted under 35 U.S.C. 154(b) by 0 days.

(21) Appl. No.: 14/732,828

(22) Filed: Jun. 8, 2015

Related U.S. Application Data

(60) Provisional application No. 62/009,375, filed on Jun. 9, 2014.

(51) Int. Cl.
    *G06K 9/00* (2006.01)
    *G06T 7/00* (2006.01)
    *G06K 9/46* (2006.01)

(52) U.S. Cl.
    CPC ......... *G06T 7/0026* (2013.01); *G06K 9/00201* (2013.01); *G06K 9/46* (2013.01); *G06T 2207/20104* (2013.01)

(58) Field of Classification Search
    USPC ............................................. 382/224–228
    See application file for complete search history.

(56) References Cited

U.S. PATENT DOCUMENTS

| | | | | |
|---|---|---|---|---|
| 6,314,197 | B1* | 11/2001 | Jain | G06K 9/00087 382/125 |
| 6,334,176 | B1* | 12/2001 | Scales, III | G06F 9/30025 712/4 |
| 2005/0094898 | A1* | 5/2005 | Xu | G06K 9/00208 382/294 |
| 2015/0105698 | A1* | 4/2015 | Park | A61B 5/055 600/587 |

* cited by examiner

*Primary Examiner* — Alex Liew
(74) *Attorney, Agent, or Firm* — Reches Patents

(57) ABSTRACT

A non-transitory computer readable medium that stores instructions that once executed by a computer cause the computer to execute the stages of: calculating first curvature attributes of first areas of a first representation of a first three dimensional object; calculating second curvature attributes of second areas of a second representation of a second three dimensional object; selecting first points of interest of the first representation in response to the first curvature attributes; selecting second points of interest of the second representation in response to the second curvature attributes; classifying the first points of interest to first classes; classifying the second points of interest to second classes; calculating multiple sets of first vectors that are indicative of spatial relationships between first points of interest, wherein different sets out of the multiple sets of the first vectors are associated with different first classes; calculating multiple sets of second vectors that are indicative of spatial relationships between second points of interest, wherein different sets out of the multiple sets of the second vectors are associated with different second classes; and determining a misalignment between the first and second representations of the first and second objects in response to relationships between the multiple sets of first vectors and the multiple sets of the second vectors.

13 Claims, 14 Drawing Sheets

Determining the misalignment by calculating correlations between pairs of first and second vectors that are associated with matching classes of first and second points of interest. 161

Repeating, for each pair of first and second vectors (V1(s) and V2(s)) that are associated with matching classes of first and second points of interest: (i) mapping the set of first vectors to a first function on a three dimensional rotation group (SO3F1 231(s)); mapping the set of second vectors to a second function on the three dimensional rotation group (SO3F2 232(s)); (ii) applying a first Fourier transform on the first function to provide a first Fourier transformed function (FT1(s) 241(s)); and (iii) applying a second Fourier transform on the second function to provide a second Fourier transformed function (FT2(s) 242(s)).
162

Determining the misalignment between the first and second representations of the first and second objects in response to a misalignment function (Func 250) that is responsive to values of first and second Fourier transformed functions associated with pairs of the first and second vectors that are associated with matching classes of first and second points of interest. 163

Applying an inverse Fourier transform on each of the certain functions to provide intermediate functions (Finter(1) –Finter(S) 255(1)-255(S)) and calculating a misalignment function (Fmis 260) that is responsive to the intermediate functions and is indicative of the misalignment. 164

Determining the misalignment by feeding different misalignment values to the misalignment function. 165

Determining the misalignment in responsive to scale information. 166

POINT OF INTEREST BASED ALIGNMENT OF REPRESENTATIONS OF THREE DIMENSIONAL OBJECTS

RELATED APPLICATION

This application claims priority from provisional patent Ser. No. 62/009,375 filing date Jun. 9, 2014 which is incorporated herein by reference in its entirety.

BACKGROUND OF THE INVENTION

Representations of three dimensional objects can be aligned to each other during a comparison process between these representations. The alignment process is complex as well as time and resource consuming as (a) each representation may include a vast amount of coordinates and may represent highly complex objects, and (b) the representations may be misaligned along seven degrees of freedom—x, y, z, pitch, yaw, roll and scale.

There is a growing need to provide an efficient system, method and computer for aligning representations of three dimensional objects.

SUMMARY

According to an embodiment of the invention there may be provided a method for aligning representations of three dimensional objects.

There may be provided a non-transitory computer readable medium that stores instructions that once executed by the computer cause the computer to aligning representations of three dimensional objects.

There may be provided a computer that may include a processor and a memory module. The computer is arranged to align representations of three dimensional objects.

There may be provided a non-transitory computer readable medium that may store instructions that once executed by a computer cause the computer to execute the stages of calculating first curvature attributes of first areas of a first representation of a first three dimensional object; calculating second curvature attributes of second areas of a second representation of a second three dimensional object; selecting first points of interest of the first representation in response to the first curvature attributes; selecting second points of interest of the second representation in response to the second curvature attributes; classifying the first points of interest to first classes; classifying the second points of interest to second classes; calculating multiple sets of first vectors that are indicative of spatial relationships between first points of interest, wherein different sets out of the multiple sets of the first vectors are associated with different first classes; calculating multiple sets of second vectors that are indicative of spatial relationships between second points of interest, wherein different sets out of the multiple sets of the second vectors are associated with different second classes; and determining a misalignment between the first and second representations of the first and second objects in response to relationships between the multiple sets of first vectors and the multiple sets of the second vectors.

The non-transitory computer readable medium may store instructions for compensating for the misalignment between the first and second representations of the first and second objects.

The non-transitory computer readable medium may store instructions for determining the misalignment by calculating correlations between pairs of first and second vectors that are associated with matching first and second classes.

The non-transitory computer readable medium may store instructions for repeating, for each pair of first and second vectors that are associated with matching classes of first and second points of interest mapping the set of first vectors to a first function on a three dimensional rotation group; mapping the set of second vectors to a second function on the three dimensional rotation group; applying a first Fourier transform on the first function to provide a first Fourier transformed function; applying a second Fourier transform on the second function to provide a second Fourier transformed function.

The non-transitory computer readable medium may store instructions for determining a misalignment between the first and second representations of the first and second objects in response to a misalignment function that is responsive to values of first and second Fourier transformed functions associated with pairs of the first and second vectors that are associated with matching classes of first and second points of interest.

The non-transitory computer readable medium may store instructions for determining the misalignment by feeding different misalignment values to the misalignment function.

The non-transitory computer readable medium may store instructions for receiving scale information and wherein the determining a misalignment is responsive to the scale information.

Each first vector may be indicative of a spatial relationship between two first points of interest.

Each first vector may be indicative of a spatial relationship between three first points of interest.

The first and second curvature attributes may be Jacobi field vectors.

There may be provided a non-transitory computer readable medium that may store instructions that once executed by a computer cause the computer to execute the stages of calculating first curvature attributes of first areas of a first representation of a first three dimensional object; calculating second curvature attributes of second areas of a second representation of a second three dimensional object; selecting first points of interest of the first representation in response to the first curvature attributes; selecting second points of interest of the second representation in response to the second curvature attributes; classifying the first points of interest to first classes and classifying the second points of interest to second classes; wherein each first class has a corresponding second class; calculating a set of first vectors that are indicative of spatial relationships between first points of interest for each first combination out of a first group of combinations of one or more first classes; calculating a set of second vectors that are indicative of spatial relationships between second points of interest for each second combination out of a group of second combinations of one or more second classes; wherein each first combination has a corresponding second combination; for each set of first vectors, calculating a mathematical relationship between the first set of vectors and a corresponding second set of vectors, wherein the first set of vectors is associated with a first group of combinations and the corresponding second set of vectors is associated with a corresponding second group of combinations, thereby providing multiple mathematical relationships; and determining a misalignment between the first and second representations of the first and second objects in response to the multiple mathematical relationships.

The non-transitory computer readable medium may store instructions for calculating each of the multiple mathematical relationships by mapping the set of first vectors to a first function on a three dimensional rotation group; mapping the set of second vectors to a second function on the three dimensional rotation group; applying a first Fourier transform on the first function to provide a first Fourier transformed function; applying a second Fourier transform on the second function to provide a second Fourier transformed function.

There may be provided a method that may include calculating first curvature attributes of first areas of a first representation of a first three dimensional object; calculating second curvature attributes of second areas of a second representation of a second three dimensional object; selecting first points of interest of the first representation in response to the first curvature attributes; selecting second points of interest of the second representation in response to the second curvature attributes; classifying the first points of interest to first classes; classifying the second points of interest to second classes; calculating multiple sets of first vectors that are indicative of spatial relationships between first points of interest, wherein different sets out of the multiple sets of the first vectors are associated with different first classes; calculating multiple sets of second vectors that are indicative of spatial relationships between second points of interest, wherein different sets out of the multiple sets of the second vectors are associated with different second classes; and determining a misalignment between the first and second representations of the first and second objects in response to relationships between the multiple sets of first vectors and the multiple sets of the second vectors.

The method may include compensating for the misalignment between the first and second representations of the first and second objects.

The method may include determining the misalignment by calculating correlations between pairs of first and second vectors that are associated with matching first and second classes.

The method may include repeating, for each pair of first and second vectors that are associated with matching classes of first and second points of interest mapping the set of first vectors to a first function on a three dimensional rotation group; mapping the set of second vectors to a second function on the three dimensional rotation group; applying a first Fourier transform on the first function to provide a first Fourier transformed function; applying a second Fourier transform on the second function to provide a second Fourier transformed function.

The method may include determining a misalignment between the first and second representations of the first and second objects in response to a misalignment function that is responsive to values of first and second Fourier transformed functions associated with pairs of the first and second vectors that are associated with matching classes of first and second points of interest.

The method may include determining the misalignment by feeding different misalignment values to the misalignment function.

The method may include receiving scale information and wherein the determining a misalignment may be responsive to the scale information.

Each first vector may be indicative of a spatial relationship between two first points of interest.

Each first vector may be indicative of a spatial relationship between three first points of interest.

The first and second curvature attributes may be Jacobi field vectors.

There may be provided a method that may include calculating, by a computer, first curvature attributes of first areas of a first representation of a first three dimensional object; calculating second curvature attributes of second areas of a second representation of a second three dimensional object; selecting first points of interest of the first representation in response to the first curvature attributes; selecting second points of interest of the second representation in response to the second curvature attributes; classifying the first points of interest to first classes and classifying the second points of interest to second classes; wherein each first class has a corresponding second class; calculating a set of first vectors that are indicative of spatial relationships between first points of interest for each first combination out of a first group of combinations of one or more first classes; calculating a set of second vectors that are indicative of spatial relationships between second points of interest for each second combination out of a group of second combinations of one or more second classes; wherein each first combination has a corresponding second combination; for each set of first vectors, calculating a mathematical relationship between the first set of vectors and a corresponding second set of vectors, wherein the first set of vectors is associated with a first group of combinations and the corresponding second set of vectors is associated with a corresponding second group of combinations, thereby providing multiple mathematical relationships; and determining a misalignment between the first and second representations of the first and second objects in response to the multiple mathematical relationships.

The method may include calculating each of the multiple mathematical relationships by mapping the set of first vectors to a first function on a three dimensional rotation group; mapping the set of second vectors to a second function on the three dimensional rotation group; applying a first Fourier transform on the first function to provide a first Fourier transformed function; applying a second Fourier transform on the second function to provide a second Fourier transformed function.

There may be provided a computer that may include a memory module and a processor, wherein the processor may be arranged to calculate first curvature attributes of first areas of a first representation of a first three dimensional object; calculate second curvature attributes of second areas of a second representation of a second three dimensional object; select first points of interest of the first representation in response to the first curvature attributes; select second points of interest of the second representation in response to the second curvature attributes; classify the first points of interest to first classes; classify the second points of interest to second classes; calculate multiple sets of first vectors that are indicative of spatial relationships between first points of interest, wherein different sets out of the multiple sets of the first vectors are associated with different first classes; calculate multiple sets of second vectors that are indicative of spatial relationships between second points of interest, wherein different sets out of the multiple sets of the second vectors are associated with different second classes; and determine a misalignment between the first and second representations of the first and second objects in response to relationships between the multiple sets of first vectors and the multiple sets of the second vectors.

The processor may be arranged to compensate for the misalignment between the first and second representations of the first and second objects.

The processor may be arranged to determine the misalignment by calculate correlations between pairs of first and second vectors that are associated with matching first and second classes.

The processor may be arranged to repeat, for each pair of first and second vectors that are associated with matching classes of first and second points of interest mapping the set of first vectors to a first function on a three dimensional rotation group; mapping the set of second vectors to a second function on the three dimensional rotation group; applying a first Fourier transform on the first function to provide a first Fourier transformed function; applying a second Fourier transform on the second function to provide a second Fourier transformed function.

The computer wherein the processor may be arranged to determine a misalignment between the first and second representations of the first and second objects in response to a misalignment function that is responsive to values of first and second Fourier transformed functions associated with pairs of the first and second vectors that are associated with matching classes of first and second points of interest.

The processor may be arranged to determine the misalignment by feeding different misalignment values to the misalignment function.

The processor may be arranged to receiving scale information and to determine a misalignment in response to the scale information.

Each first vector may be indicative of a spatial relationship between two first points of interest.

Each first vector may be indicative of a spatial relationship between three first points of interest.

The first and second curvature attributes may be Jacobi field vectors.

There may be provided a computer that may include a memory module and a processor, wherein the processor may be arranged to calculate first curvature attributes of first areas of a first representation of a first three dimensional object; calculate second curvature attributes of second areas of a second representation of a second three dimensional object; select first points of interest of the first representation in response to the first curvature attributes; select second points of interest of the second representation in response to the second curvature attributes; classify the first points of interest to first classes and classify the second points of interest to second classes; wherein each first class has a corresponding second class; calculate a set of first vectors that are indicative of spatial relationships between first points of interest for each first combination out of a first group of combinations of one or more first classes; calculate a set of second vectors that are indicative of spatial relationships between second points of interest for each second combination out of a group of second combinations of one or more second classes; wherein each first combination has a corresponding second combination; for each set of first vectors, calculate a mathematical relationship between the first set of vectors and a corresponding second set of vectors, wherein the first set of vectors is associated with a first group of combinations and the corresponding second set of vectors is associated with a corresponding second group of combinations, thereby providing multiple mathematical relationships; and determine a misalignment between the first and second representations of the first and second objects in response to the multiple mathematical relationships.

The processor may be arranged to calculate each of the multiple mathematical relationships by mapping the set of first vectors to a first function on a three dimensional rotation group; mapping the set of second vectors to a second function on the three dimensional rotation group; applying a first Fourier transform on the first function to provide a first Fourier transformed function; applying a second Fourier transform on the second function to provide a second Fourier transformed function.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 illustrates a stage of the method of FIG. 1 according to an embodiment of the invention;

DETAILED DESCRIPTION OF THE DRAWINGS

Figure 1:
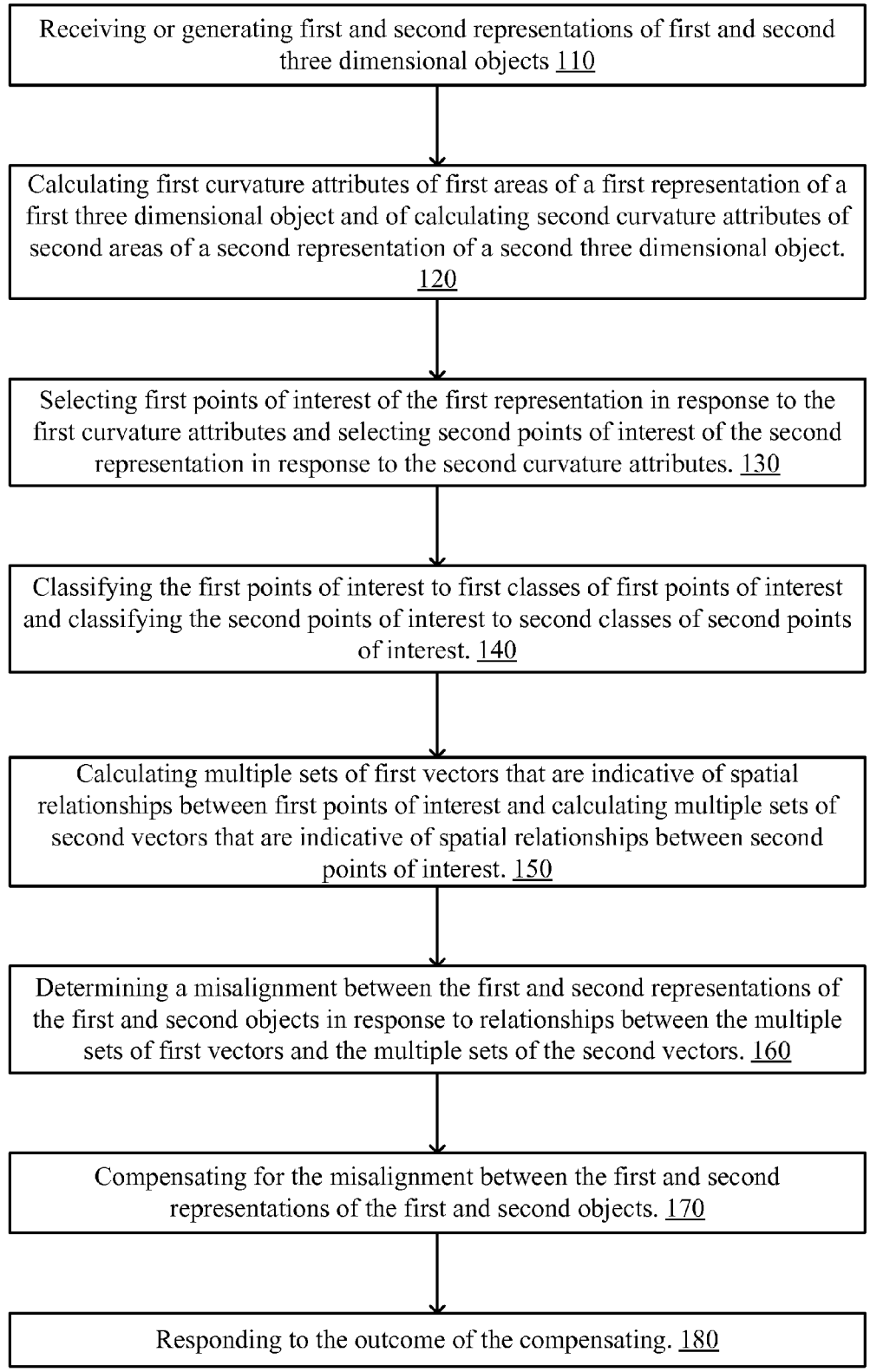
FIG. 1 illustrates a method according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The following mathematical terms are being used in the specification:
  a. Sphere—the two dimensional sphere (also known as sphere or $S^2$) is a set of points that are all the same distance r from a given point in three-dimensional space. This distance r is the radius of the sphere, and the given point is the center of the sphere.
  b. SO(3) is also known as the three dimensional rotation group. It is the group of all rotations about the origin of three-dimensional Euclidean space $R^3$ under the operation of composition. By definition, a rotation about the origin is a transformation that preserves the origin, Euclidean distance (so it is an isometry), and orientation.
  c. The Fourier transform is a mathematical transformation employed to transform signals between the spatial domain and the frequency domain. There are Fourier transforms for functions defined on SO(3).
  d. SOFT—the SO(3) Fourier Transforms (SOFT) is a collection of computer routines that compute the Fourier transform for functions defined on SO(3).
  e. Gaussian curvature or Gauss curvature—in differential geometry, the Gaussian curvature or Gauss curvature of a point on a surface is the product of the principal curvatures, $\kappa_1$ and $\kappa_2$, of the given point. It is an intrinsic measure of curvature, i.e., its value depends only on distances that are measured on the surface, not on the way it is isometrically embedded in space.
  f. In Riemannian geometry, a Jacobi field is a vector field along a geodesic γ in a Riemannian manifold describing the difference between the geodesic and an "infinitesimally close" geodesic. In other words, the Jacobi fields along a geodesic form the tangent space to the geodesic in the space of all geodesics. They are named after Carl Jacobi.

Figure 2:
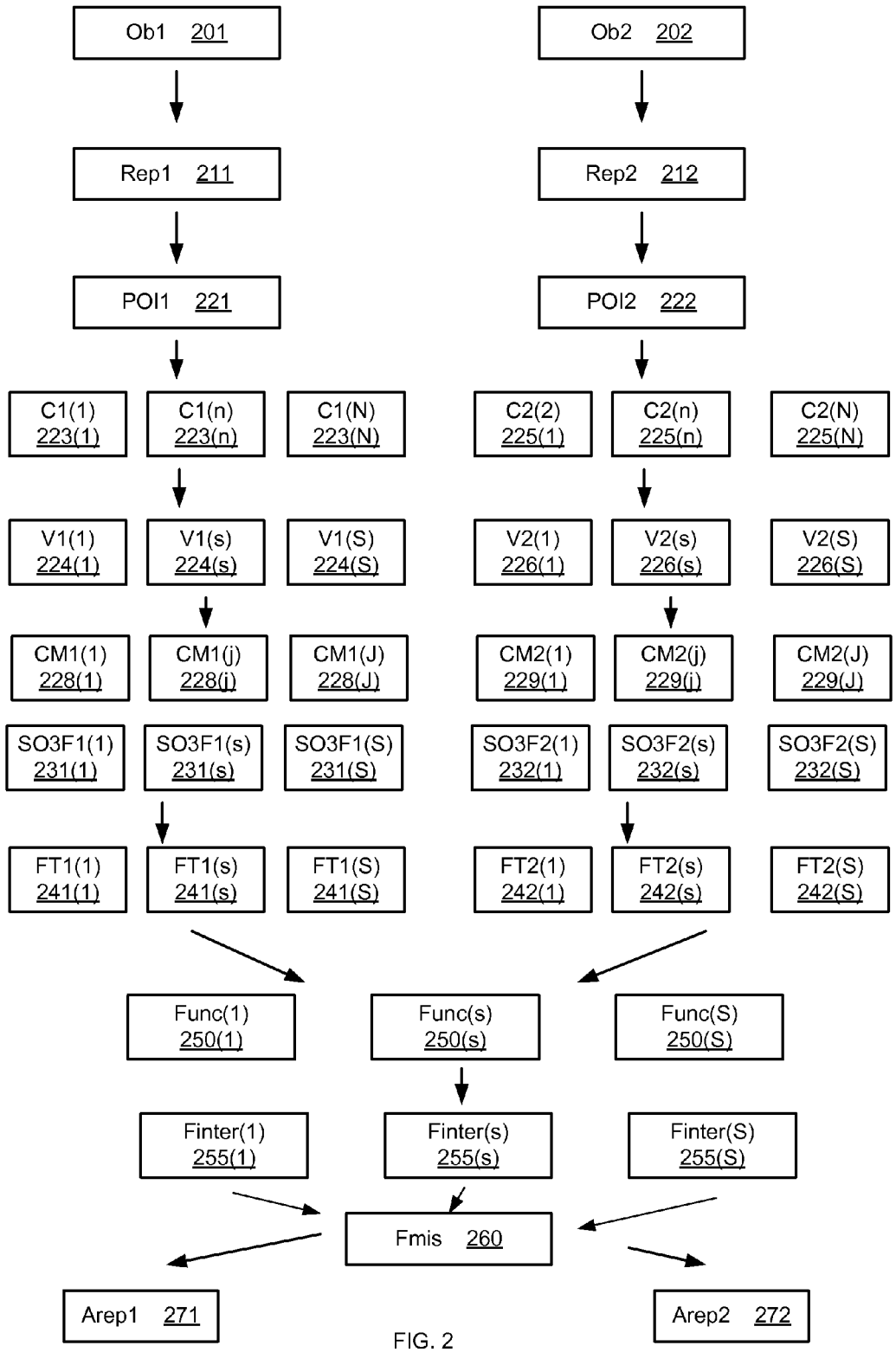
FIG. 2 illustrates various objects and data entities according to an embodiment of the invention.

FIG. 1 illustrates method 100 according to an embodiment of the invention. FIG. 2 illustrates various elements according to an embodiment of the invention.

Method 100 may start by stage 110 of receiving or generating first and second representations (Rep1 211 and Rep2 212 of FIG. 2) of first and second three dimensional objects (Ob1 201 and Ob2 202 of FIG. 2). The first and second objects may differ from each other, may be the same object, may partially overlap, may be non-overlapping, and the like.

The first and second representations may be generated by any manner. For example, they may be generated by imaging the first and second objects, by processing images of the first and second objects, and the like.

The first and second representations may include (or exclude) scale information.

Stage 110 may include processing the first and second representations, for example, by filtering, smoothing, edge enhancing, and/or augmenting any one of the first and second representations.

The first and second representations (Rep1 211 and Rep2 212 of FIG. 2) can be provided in any format. For example, they may be STL (stereolithography) compliant, PLY (polygon file format or Stanford file format) compliant and the like.

Stage 110 may include changing the format of at least one of the representations so that both representations (Rep1 211 and Rep2 212 of FIG. 2) are of the same format. FIGS. 6-13 illustrate first and second representations 211 and 212 of hands.

Referring back to FIG. 1—stage 110 may be followed by stage 120 of calculating first curvature attributes of first areas of a first representation of a first three dimensional object and of calculating second curvature attributes of second areas of a second representation of a second three dimensional object.

Figure 12:
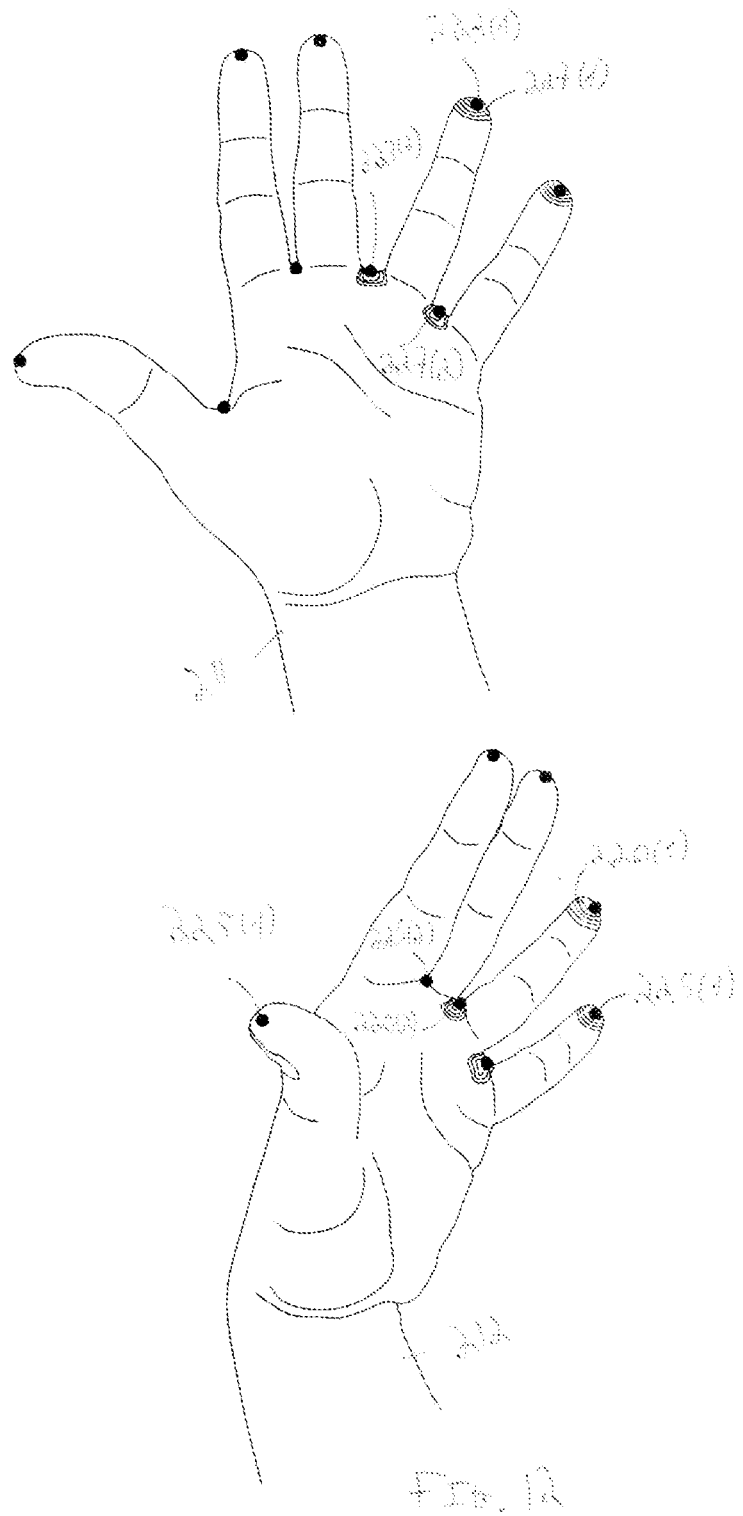
FIG. 12 illustrates two sets of coordinates corresponding to the representations of first and second hands and points of interest according to an embodiment of the invention.

FIG. 12 illustrates areas 227(1) and 227(2) of the first representation 211 of a first hand. Areas 227(1) and 227(2) include points of interest 223(1) and 223(2) respectively. First points of interest 223(1) represent fingertips and second points of interest 223(2) represent inter-finger areas.

FIG. 12 also illustrates areas 220(1) and 220(2) of the second representation 211 of a second hand. Areas 220(1) and 220(2) include points of interest 225(1) and 225(2) respectively. First points of interest 225(1) represent fingertips and second points of interest 225(2) represent inter-finger areas.

Referring back to FIG. 1—the first and second curvature attributes may be Jacobi field vectors or any attributes related to the curvature of the areas.

Stage 120 may be followed by stage 130 of selecting first points of interest (POI1 221) of the first representation in response to the first curvature attributes and selecting second points of interest (POI2 222) of the second representation in response to the second curvature attributes.

The first points of interest may be positioned within some of the first areas and the second points of interest may be positioned within some of the second areas. For example—each point of interest may be positioned at the center of an area or be located off-center.

Stage 130 may be followed by stage 140 of classifying the first points of interest to first classes (C1(1)-C1(N) 223(1)-

223(N)) of first points of interest and classifying the second points of interest to second classes (C2(1)-C2(N) 224(1)-224(N)) of second points of interest.

The classification of the first and second points of interest may be done according to the same classification criterion to provide associated classes of first and second points of interest.

The classification can be responsive to the values of the first and second curvature attributes. The classification can involve allocating different ranges of curvature attribute values to different classes.

Additionally or alternatively—the classification may involve allocating different classes in response to the relative curvature attributes. For example—different classes can include points of interest of different percentiles of curvature attributes.

Yet for another example, when the objects are human hands a first class may include points positioned at fingertips (convex) while a second class can include the points positioned at inter-finger areas (concave) positions between adjacent fingers.

See, for example and in FIGS. 6-13, first points of interest (of first class) 223(1) of a first hand, second points of interest (of second class) 223(2) of the first hand, first points of interest (of first class) 225(1) of a second hand, second points of interest (of second class) 225(2) of the second hand.

It may be desired to perform class based spatial relationship calculation for each of the first and second points of interest. This may be followed by a class based correlation.

The class based spatial relationship calculation may be executed during stage 150 that follows stage 140.

Stage 150 may include calculating multiple sets of first vectors (V1(1)-V1(S) 225(1)-225(S)) that are indicative of spatial relationships between first points of interest and calculating multiple sets of second vectors (V2(1)-V2(S) 226(1)-226(S)) that are indicative of spatial relationships between second points of interest.

The class based calculation dictates that different sets out of the multiple sets of the first vectors are associated with different first classes and different sets out of the multiple sets of the second vectors are associated with different second classes.

For example—assuming that there are two first classes and that each first vector represents the spatial relationship between a pair of first points of interest then up to three different sets of first vectors can be calculated:
a. A first set of first vectors (V1(1)) will be indicative of the spatial relationships between pairs of first points of interest that belong to the first class of the first points of interest.
b. A second set of first vectors (V1(2)) will be indicative of the spatial relationships between pairs of first points of interest that belong to the second class of the first points of interest.
c. A third set of first vectors (V1(3)) will be indicative of the spatial relationships between pairs of first points of interest—one of which belongs to the first class of first points of interest and the second belongs to the second class of the first points of interest.

Corresponding second sets of vectors (V2(1)-V2(3)) are calculated for the second vectors.

The next examples are provided assuming, for example, that the objects are hands and that the points of interest belong to two classes—fingertips (very convex) and inter-finger area between adjacent fingers (very concave).

It is noted that sets of first and second vectors may be defined for all possible combination of points of interest or to a subset of combinations.

A first set of first vectors will be defined between points of interest that are suspected to belong to fingertips (of a first hand). See, for example and in FIG. 8, first set of vectors 224(1) that connect pairs of second points of interest 223(2) of the first hand.

A second set of first vectors will be defined between points of interest that are suspected to belong to inter-finger areas (of the first hand). See, for example and in FIG. 9, second set of vectors 224(2) that connect pairs of first points of interest 223(1) of the first hand.

A third set of first vectors will be defined between pairs of points of interest—one suspected to belong to a fingertip (of the first hand) and one suspected to belong to an inter-finger area (of the first hand). See, for example and in FIG. 10, third set of vectors 224(3) that connect first and second points of interest 223(1) and 223(2) of the first hand.

A first set of second vectors will be defined between points of interest that are suspected to belong to fingertips (of a second hand). See, for example and in FIG. 8, first set of vectors 226(1) that connect second points of interest 225(2) of the second hand.

A second set of second vectors will be defined between points of interest that are suspected to belong to inter-finger areas (of the second hand). See, for example and in FIG. 9, second set of vectors 226(2) that connect first points of interest 225(1) of the second hand.

A third set of second vectors will be defined between pairs of points of interest—one suspected to belong to a fingertip (of the second hand) and one suspected to belong to an inter-finger area (of the second hand). See, for example and in FIG. 10, third set of vectors 226(3) that connect first and second points of interest 225(1) and 225(2) of the second hand.

Yet for another example—assuming that there are two classes of first points of interest and that each first vector represents the spatial relationship between a triplet of first points of interest then up to four different sets of first vectors can be calculated:
a. A first set of first vectors (V1(1)) will be indicative of the spatial relationships between triplets of first points of interest that belong to the first class of the first points of interest.
b. A second set of first vectors (V1(2)) will be indicative of the spatial relationships between triplets of first points of interest that belong to the second class of the first points of interest.
c. A third set of first vectors (V1(3)) will be indicative of the spatial relationships between triplets of first points of interest—one of which belongs to the first class of first points of interest and two belong to the second class of the first points of interest.
d. A fourth set of first vectors (V1(4)) will be indicative of the spatial relationships between triplets of first points of interest—two of which belong to the first class of first points of interest and one belongs to the second class of the first points of interest.

The same sets of second vectors (V2(1)-V2(4)) are defined so that each set of first vectors has an associated set of second vectors.

For example:
a. A first set of first vectors will be defined to represent the spatial relationships between triplets of points of interest that are suspected to belong to fingertips (of the first hand).

b. A second set of first vectors will be defined to represent the spatial relationships between triplets of points of interest that are suspected to belong to inter-finger areas (of the first hand).
c. A third set of first vectors will be defined to represent the spatial relationships between triplets of points of interest that include one point of interest that are suspected to belong to fingertips (of the first hand) and a pair of points of interest that are suspected to belong to inter-finger areas (of the first hand).
d. A fourth set of first vectors will be defined to represent the spatial relationships between triplets of points of interest that include a pair of points of interest that are suspected to belong to fingertips (of the first hand) and a single point of interest that is suspected to belong to inter-finger areas (of the first hand). See, for example and in FIG. 11—a triplet of points of interest of the first hand (223(1), 223(1) and 223(3)) are represented by a vector 224(4) that is normal to the virtual triangle that connects the triplet of points.

Yet for another example:
a. A first set of second vectors will be defined to represent the spatial relationships between triplets of points of interest that are suspected to belong to fingertips (of the second hand).
b. A second set of second vectors will be defined to represent the spatial relationships between triplets of points of interest that are suspected to belong to inter-finger areas (of the second hand).
c. A third set of second vectors will be defined to represent the spatial relationships between triplets of points of interest that include one point of interest that are suspected to belong to fingertips (of the second hand) and a pair of points of interest that are suspected to belong to inter-finger areas (of the second hand).
d. A fourth set of second vectors will be defined to represent the spatial relationships between triplets of points of interest that include a pair of points of interest that are suspected to belong to fingertips (of the second hand) and a single point of interest that is suspected to belong to inter-finger areas (of the second hand). For example, referring to FIG. 11—a triplet of points of interest of the second hand (225(1), 225(1) and 225(3)) are represented by a vector 226(4) that is normal to the virtual triangle that connects the triplet of points of interest.

Referring back to FIG. 1—stage 150 may be followed by stage 160 of determining a misalignment between the first and second representations of the first and second objects in response to relationships between the multiple sets of first vectors and the multiple sets of the second vectors.

Figure 13:
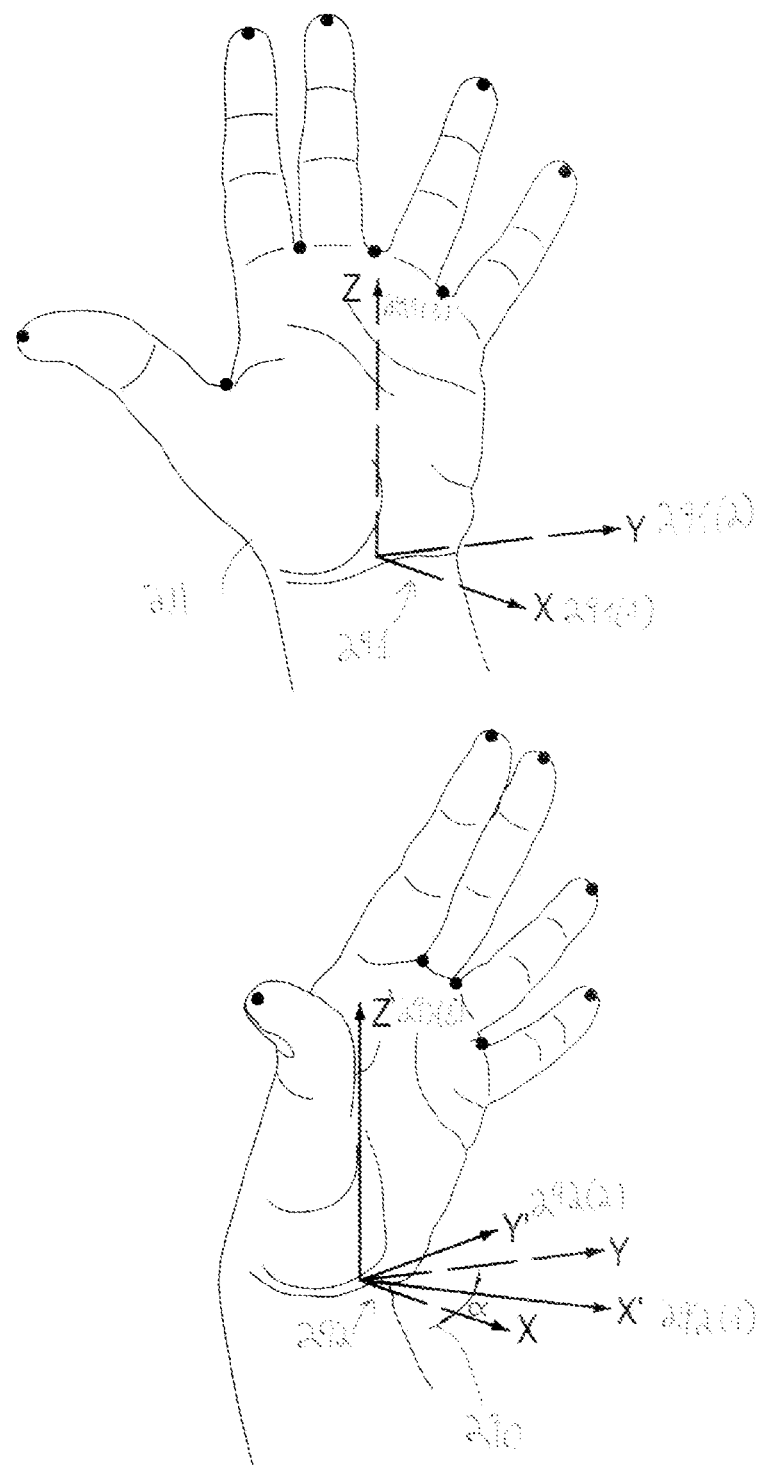
FIG. 13 illustrates representations of first and second hands, points of interest and areas that includes the points of interest according to an embodiment of the invention.

FIG. 13 illustrates a first set of coordinates 291 (X,Y and Z axes 291(1), 291(2) and 293(3) respectively) of the first hand and a second set of coordinates 292 (X',Y' and Z' axes 292(1), 292(2) and 292(3) respectively) of the second hand and misalignment (alpha) 290 between these sets of coordinates 291 and 292. Alignment may involve rotating one representation in relation to the other by alpha.

The relationships taken into account may be the relationships between associated sets of first and second vectors.

Stage 160 may include at least one of stages 161-166 all illustrated in FIG. 3:
  a. Stage 161 of determining the misalignment by calculating correlations between pairs of first and second vectors that are associated with matching classes of first and second points of interest.
  b. Stage 162 of repeating, for each pair of first and second vectors (V1($s$) and V2($s$)) that are associated with matching classes of first and second points of interest: (i) mapping the set of first vectors to a first function on a three dimensional rotation group (SO3F1 231($s$)); mapping the set of second vectors to a second function on the three dimensional rotation group (SO3F2 232($s$)); (ii) applying a first Fourier transform on the first function to provide a first Fourier transformed function (FT1($s$) 241($s$)); and (iii) applying a second Fourier transform on the second function to provide a second Fourier transformed function (FT2($s$) 242($s$)).
  c. Stage 163 of determining the misalignment between the first and second representations of the first and second objects in response to a misalignment function (Func 250) that is responsive to values of first and second Fourier transformed functions associated with pairs of the first and second vectors that are associated with matching classes of first and second points of interest. This may include multiplying each first Fourier transformed function by a corresponding second Fourier transformed function to provide multiple certain functions (Func(1)-Func(S) 250(1)-250(S))—one certain function (Func 250($s$)) per a pair of corresponding first and second Fourier transformed functions (FT1($s$) 241($s$) and FT2($s$) 242($s$)). For example—one certain function will be calculated by multiplying a first Fourier transformed function related to first points of interest that belong to fingertips of a first hand with a second Fourier transformed function related to second points of interest that belong to fingertips of a second hand.
  d. Stage 164 of applying an inverse Fourier transform on each of the certain functions to provide intermediate functions (Finter(1)-Finter(S) 255(1)-255(S)) and calculating a misalignment function (Fmis 260) that is responsive to the intermediate functions and is indicative of the misalignment. The misalignment function may be, for example, a sum of all intermediate functions.
  e. Stage 165 of determining the misalignment by feeding different misalignment values to the misalignment function. The misalignment function can provide an estimate of the correlation between the first and second representations given a misalignment value and stage 165 may include selecting the misalignment value that provides the best correlation between the first and second representations.
  f. Stage 166 of determining the misalignment in responsive to scale information.

Stage 160 may be followed by stage 170 of compensating for the misalignment between the first and second representations of the first and second objects.

Stage 170 may be followed by stage 180 of responding to the outcome of the compensating.

The responding may include at least one out of:
  a. Printing the first object by a 3D printer—if the aligned representations fulfill a certain criterion (such as a resemblance).
  b. Displaying to a user one or more objects that are similar to the object fed by the user.
  c. Allowing the user to elect one or more of the displayed objects as the best fitting object.
  d. Sending information required for printing a displayed object to the 3D printer.
  e. Allowing the user to send instructions for modifying the object (thus deviating from the object having its representation stored in the database).

f. Generating instructions required for 3D printing the modified object by the 3D printer.

g. Printing the modified 3D object.

According to an embodiment of the invention at least some of the calculations regarding one of the objects may be done in advance and the outcome of these calculations may be fetched during the alignment process.

For example, assuming that the first representation in known before it is being aligned to the second representation then at least one out of the following may be calculated in advance and fetched during process 100:

a. The processing of the first representation (stage 110).

b. The calculating of the first curvature attributes (stage 120).

c. The selecting first points of interest (stage 130).

d. The classifying the first points of interest to first classes (stage 140).

e. The calculating multiple sets of first vectors that are indicative of spatial relationships between first points of interest (stage 150).

If, for example, the first curvature attributes is calculated in advance than stage 130 may be fed with the first curvature attributes. If, for example, the first points of interest are selected calculated in advance than stage 140 may be fed with the first points of interest. If, for example, the first points of interest are classified to first classes in advance than stage 150 may be fed with the points of interest that belong to the first classes. If, for example, the multiple sets of first vectors are calculated in advance than stage 160 may be fed with the multiple sets of first vectors.

Figure 4:
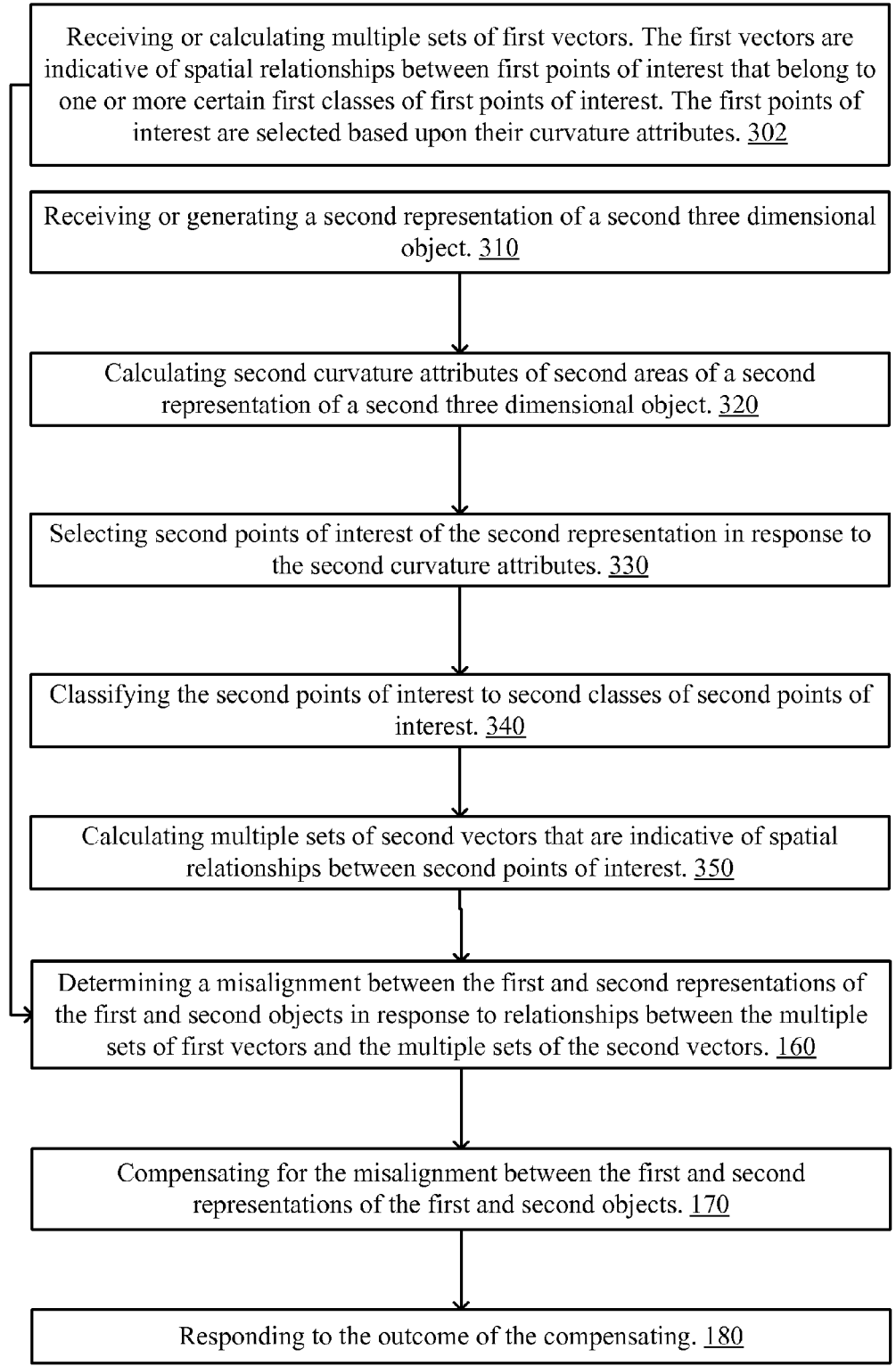
FIG. 4 illustrates a method according to an embodiment of the invention.

FIG. 4 illustrates method 300 according to an embodiment of the invention.

Method 300 may start by stage 302 and 310.

Stage 302 may include receiving or calculating multiple sets of first vectors. The first vectors are indicative of spatial relationships between first points of interest that belong to one or more certain first classes of first points of interest. The first points of interest are selected based upon their curvature attributes. Stage 302 may be followed by stage 360.

Stage 310 may include receiving or generating a second representation of a second three dimensional object. The first and second objects may differ from each other, may be the same object, may partially overlap, may be non-overlapping, and the like.

The first and second representations may be generated by any manner. For example, they may be generated by imaging the first and second objects, by processing images of the first and second objects, and the like.

The first and second representations may include (or exclude) scale information.

Stage 310 may include processing the first and second representations, for example, by filtering, smoothing, edge enhancing, and/or augmenting any one of the first and second representations.

Stage 310 may be followed by stage 320 of calculating second curvature attributes of second areas of a second representation of a second three dimensional object.

Stage 320 may be followed by stage 330 of selecting second points of interest (POI2) of the second representation in response to the second curvature attributes.

Stage 330 may be followed by stage 340 of classifying the second points of interest to second classes of second points of interest.

Stage 340 may be followed by stage 350 of calculating multiple sets of second vectors that are indicative of spatial relationships between second points of interest.

Stage 350 may be followed by stage 160 that may be followed by stage 170.

Figure 5:
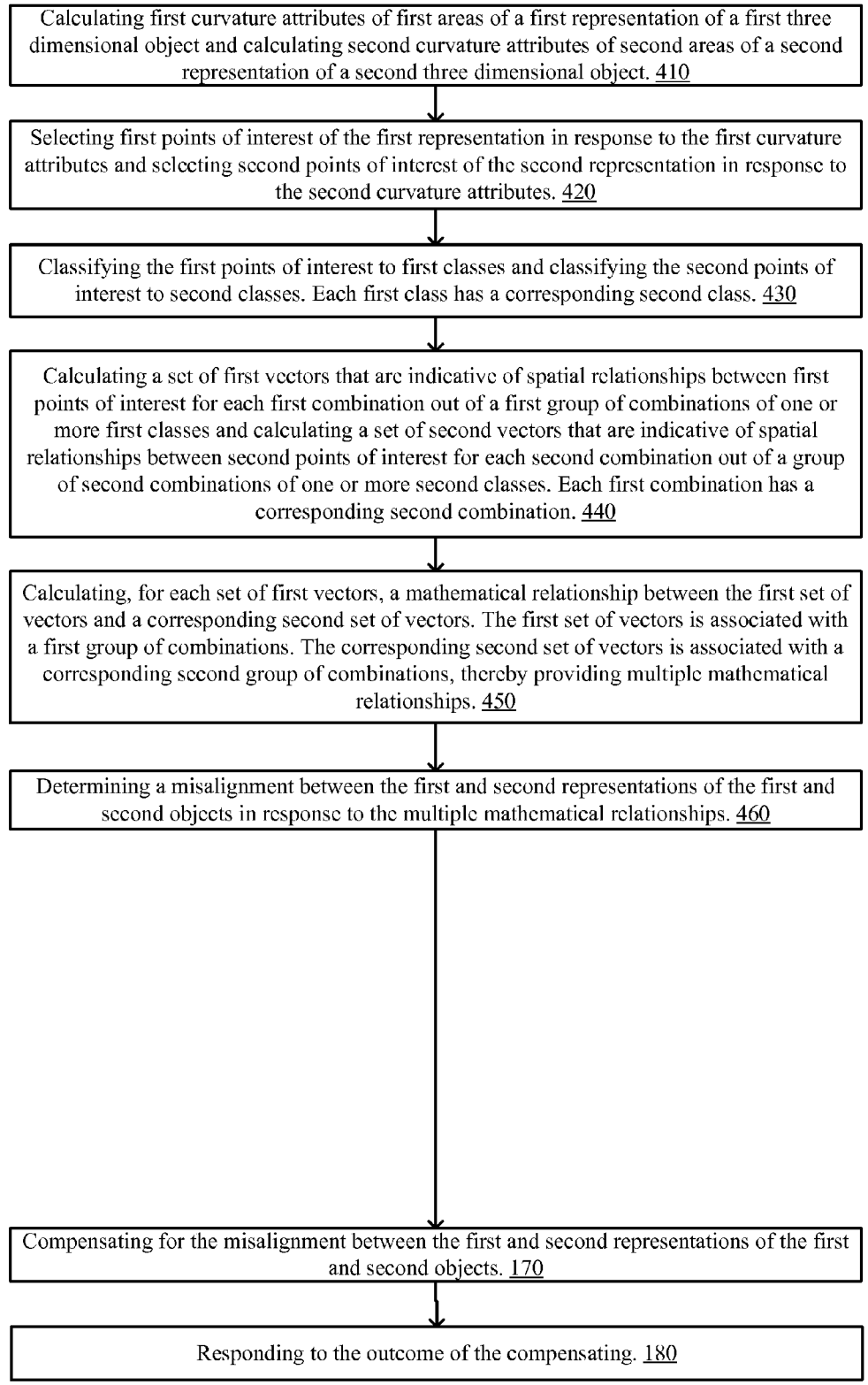
FIG. 5 illustrates a method according to an embodiment of the invention.
Figure 6:
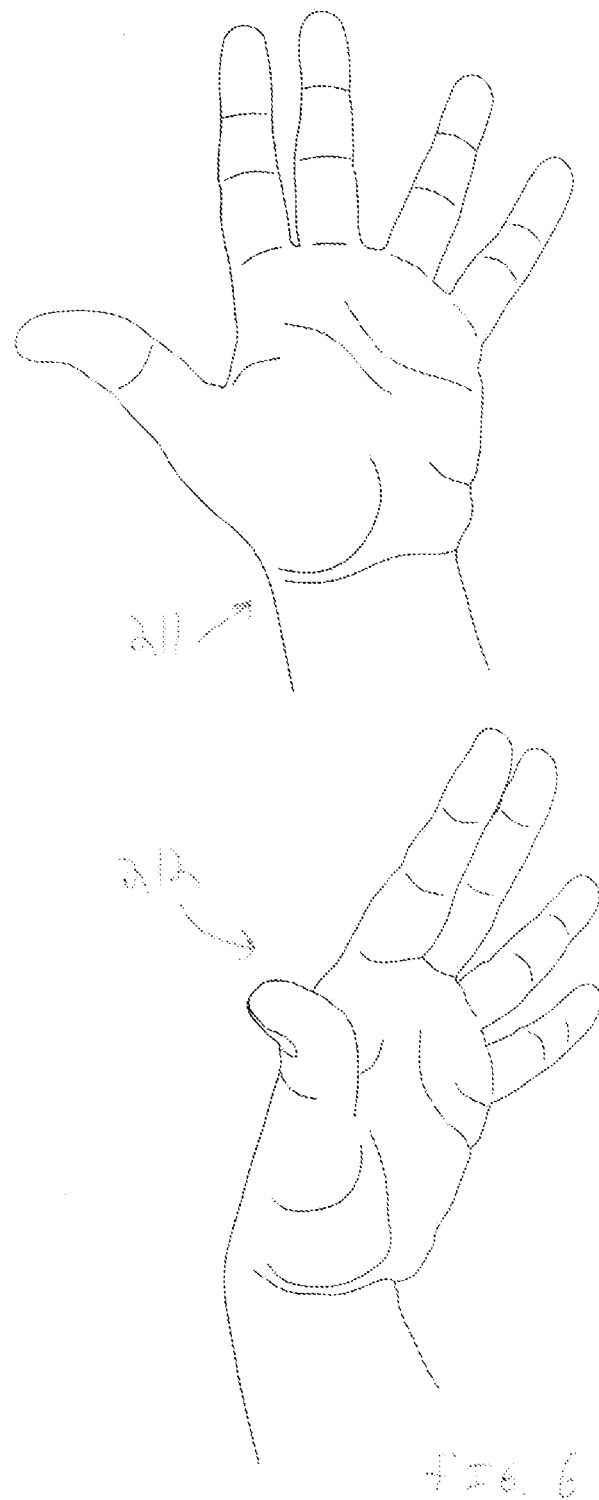
FIG. 6 illustrates representations of first and second hands according to an embodiment of the invention.
Figure 7:
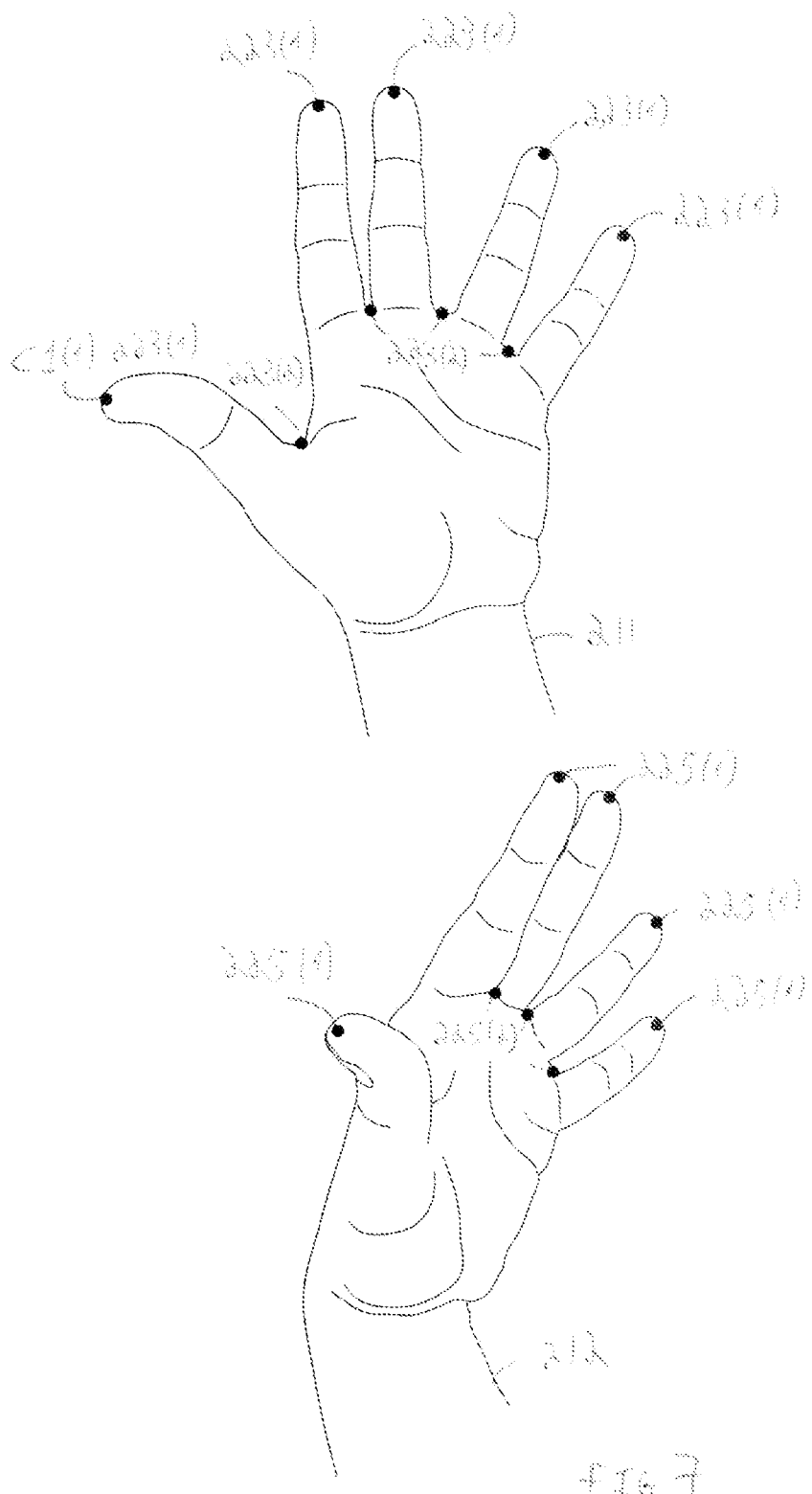
FIG. 7 illustrates representations of first and second hands and points of interest according to an embodiment of the invention.

FIG. 5 illustrates method 400 according to an embodiment of the invention.

Method 400 may start by stage 410.

Stage 410 may include calculating first curvature attributes of first areas of a first representation of a first three dimensional object and calculating second curvature attributes of second areas of a second representation of a second three dimensional object.

Stage 410 may be followed by stage 420 of selecting first points of interest of the first representation in response to the first curvature attributes and selecting second points of interest of the second representation in response to the second curvature attributes.

Stage 420 may be followed by stage 430 of classifying the first points of interest to first classes and classifying the second points of interest to second classes. Each first class has a corresponding second class. For example the first and second classes can include two classes—fingertips (very convex) and inter-finger area between adjacent fingers (very concave).

Stage 430 may be followed by stage 440 of calculating a set of first vectors that are indicative of spatial relationships between first points of interest for each first combination out of a first group of combinations (CM1(1)-CM1(J) 228(1)-228(J)) of one or more first classes and calculating a set of second vectors that are indicative of spatial relationships between second points of interest for each second combination out of a group of second combinations (CM2(1)-CM2(J) 229(1)-229(J)) of one or more second classes. Each first combination (CM1(j) 228(j)) has a corresponding second combination (CM2(j) 229(j)).

Figure 8:
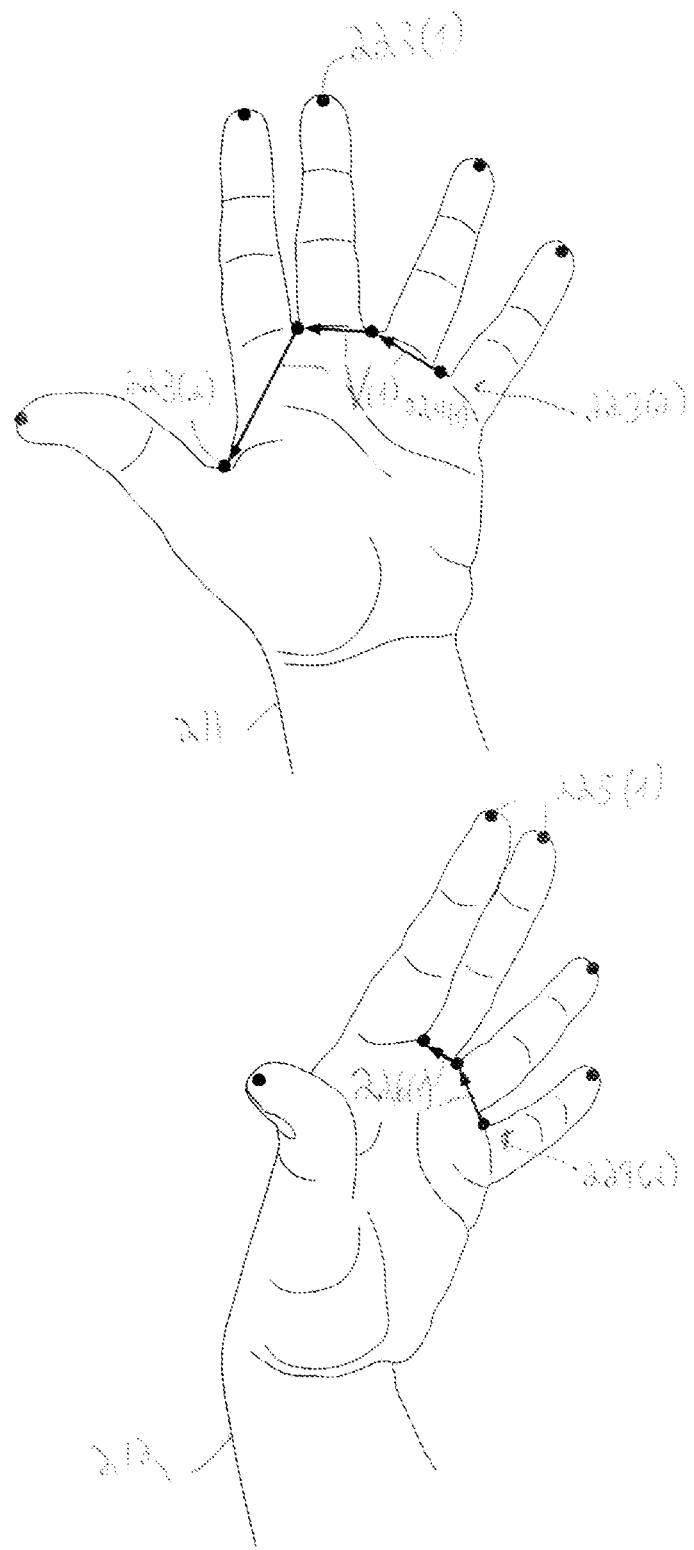
FIG. 8 illustrates representations of first and second hands, points of interest and vectors connecting pairs of second points of interest according to an embodiment of the invention.
Figure 9:
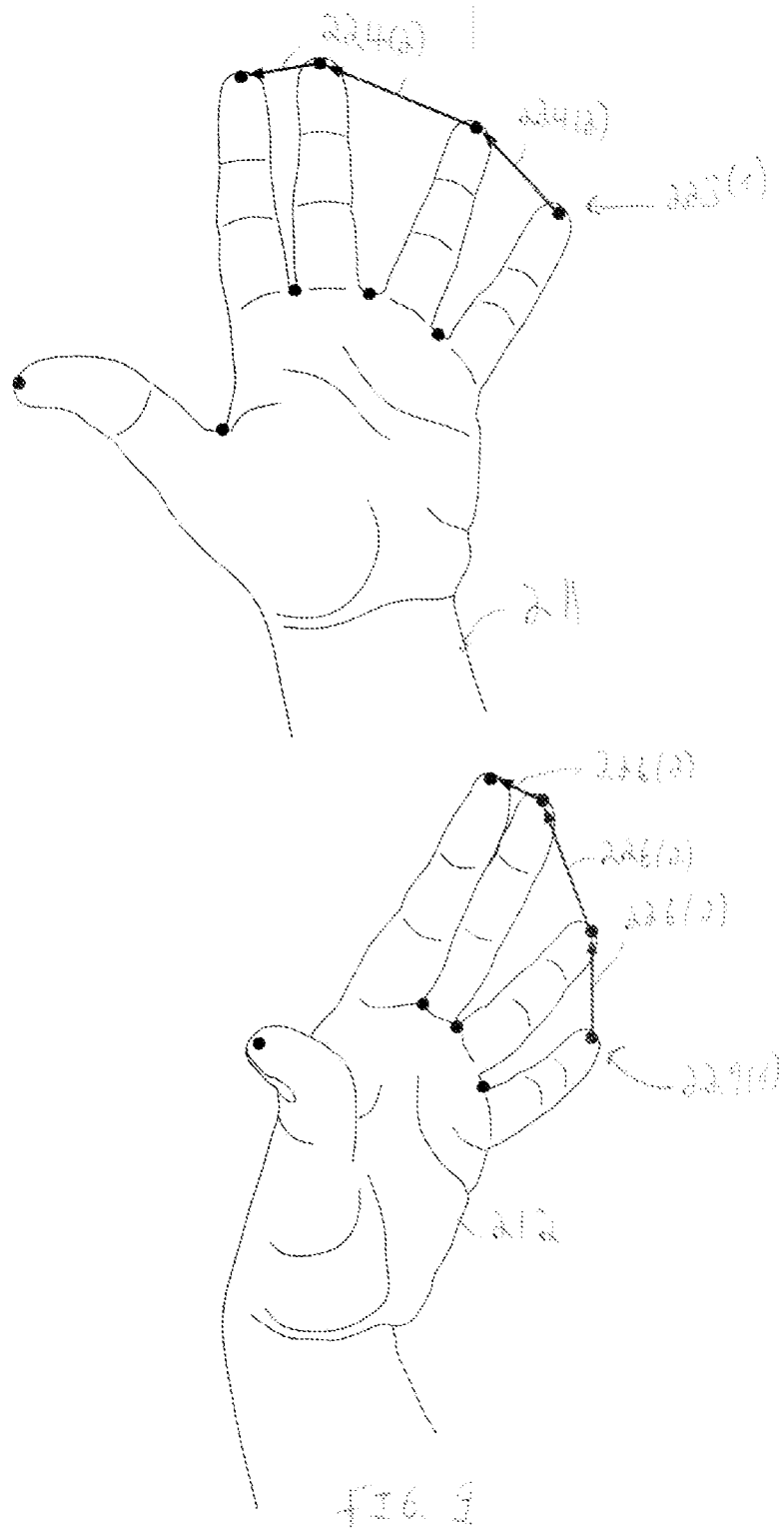
FIG. 9 illustrates representations of first and second hands, points of interest and vectors connecting pairs of first points of interest according to an embodiment of the invention.
Figure 10:
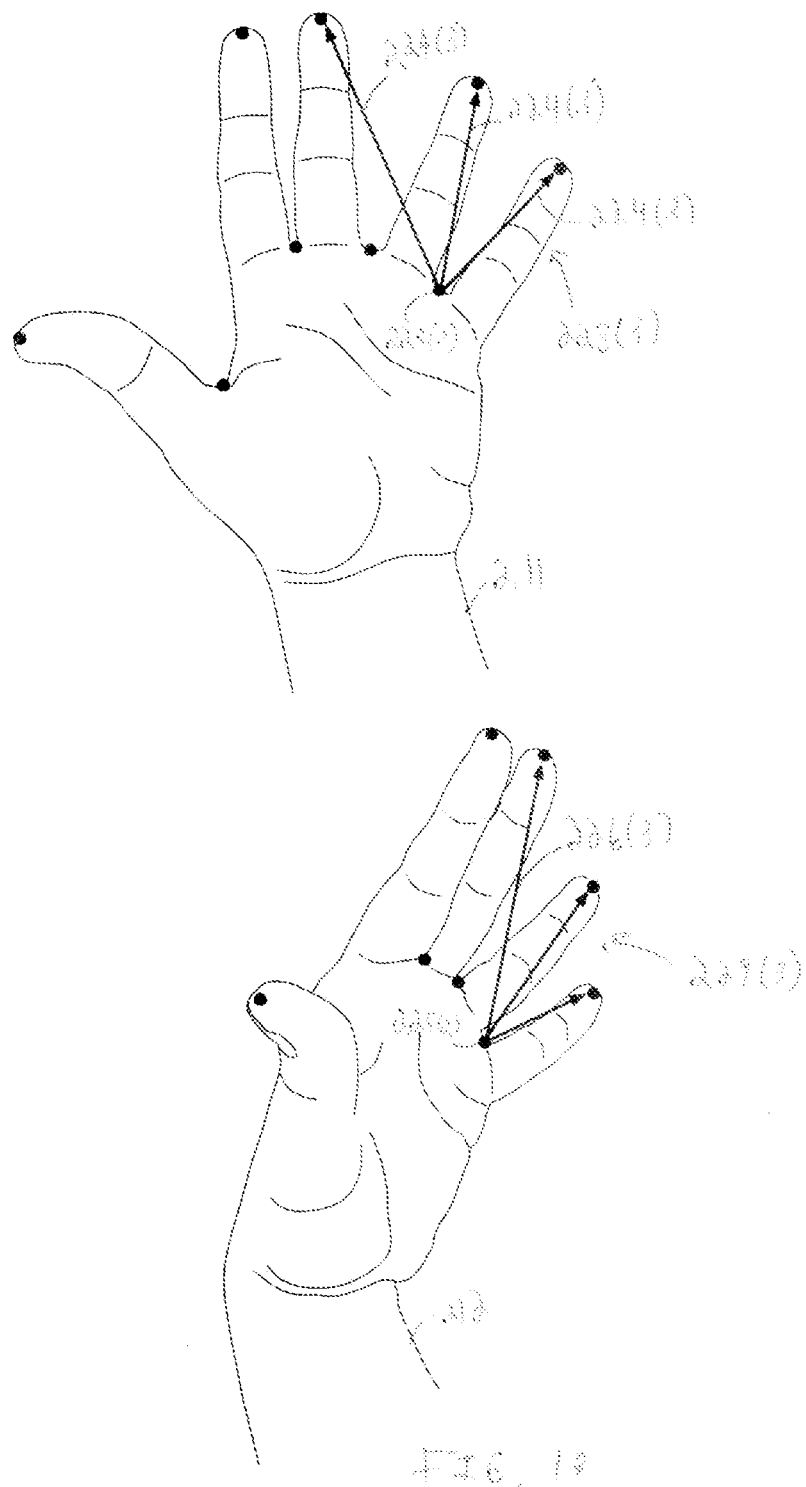
FIG. 10 illustrates representations of first and second hands, points of interest and vectors connecting pairs of first and second points of interest according to an embodiment of the invention.
Figure 11:
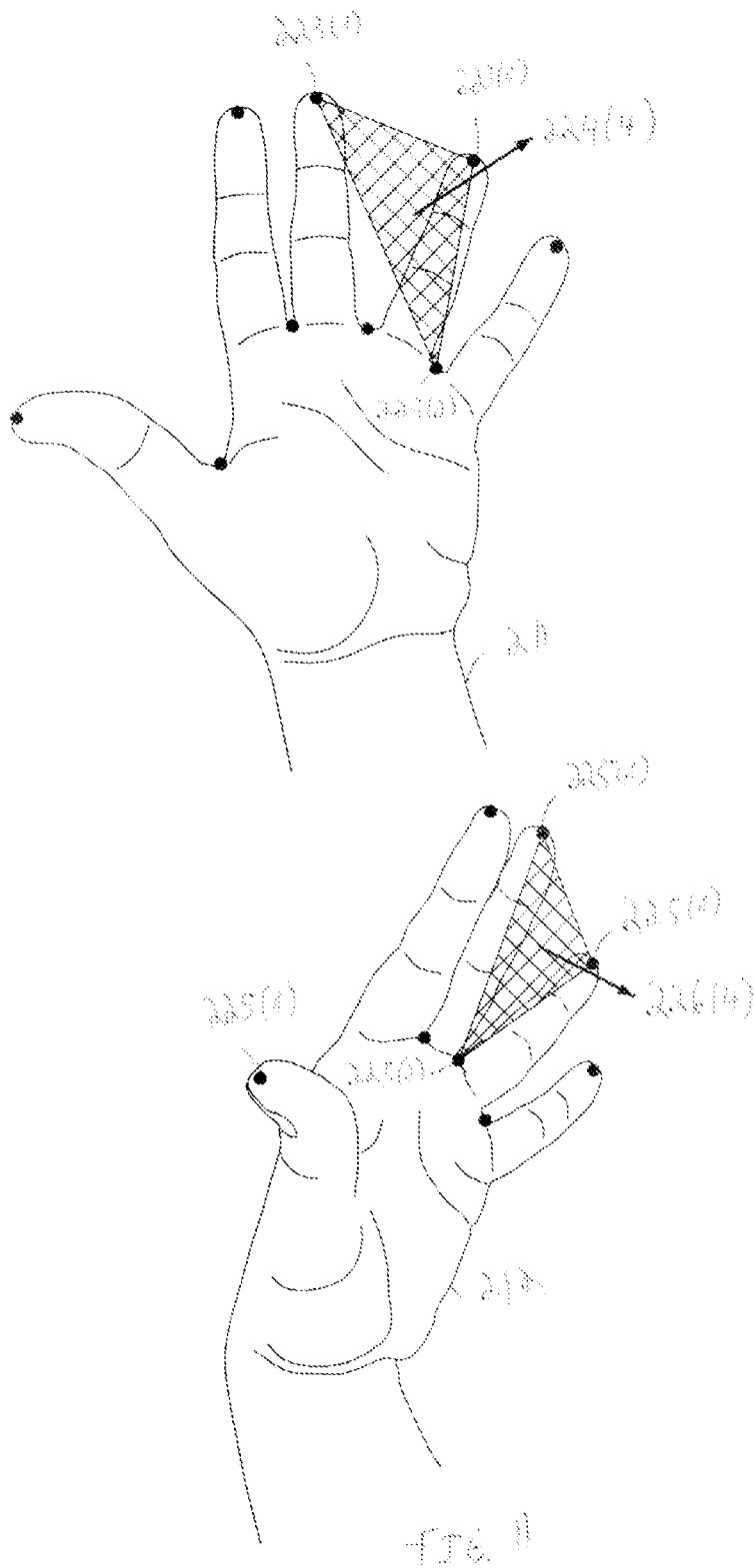
FIG. 11 illustrates representations of first and second hands, triplets of points of interest and vectors representing the triplets according to an embodiment of the invention.

For example—the first and second groups of combination may include the following combinations—(a) points of interest that belong to fingertips of the first hand (see for example in FIG. 9 combination 228(1) that includes first point of interest 223(1)), (b) points of interest that belong to fingertips of the second hand (see for example in FIG. 9 combination 229(1) that includes first point of interest 225(1)), (c) points of interest that belong to inter-finger areas of the first hand (see for example in FIG. 8 combination 228(2) that includes second point of interest 223(2)), (d) points of interest that belong to inter-finger areas of the second hand (see for example in FIG. 8 combination 229(2) that includes second point of interest 225(2)), (e) any mixture of points of interest from fingertips and inter-finger areas of the first hand (see for example in FIG. 10 combination 228(3) that includes point of interest 223(1) and 223(2)), (f) any mixture of points of interest from fingertips and inter-finger areas of the second hand (see for example in FIG. 10 combination 229(3) that includes point of interest 225(1) and 225(2)).

Stage 440 may be followed by stage 450 of calculating, for each set of first vectors, a mathematical relationship between the first set of vectors and a corresponding second set of vectors. The first set of vectors is associated with a first group of combinations. The corresponding second set of vectors is associated with a corresponding second group of combinations, thereby providing multiple mathematical relationships.

Stage 450 may include at least one of the following:

a. Mapping the set of first vectors to a first function on a three dimensional rotation group and mapping the set of second vectors to a second function on the three dimensional rotation group.

b. Applying a first Fourier transform on the first function to provide a first Fourier transformed function and applying a second Fourier transform on the second function to provide a second Fourier transformed function.

c. Multiplying corresponding first and second Fourier transformed functions to provide intermediate functions.

d. Applying an inverse Fourier transform on the intermediate functions.

Stage 450 may be followed by stage 460 of determining a misalignment between the first and second representations of the first and second objects in response to the multiple mathematical relationships. For example—in response to a misalignment function that is responsive to the outcomes of the inverse Fourier transformed intermediate functions.

Stage 460 may include determining the misalignment by feeding different misalignment values to the misalignment function and/or determining the misalignment in responsive to scale information.

Stage 460 may be followed by stage 170.

Method 400 may be amended to represent a scenario in which at least some calculations related to one of the objects are already done in advance.

Any of the methods may be executed by a system that includes a processor and a memory module.

Figure 14:
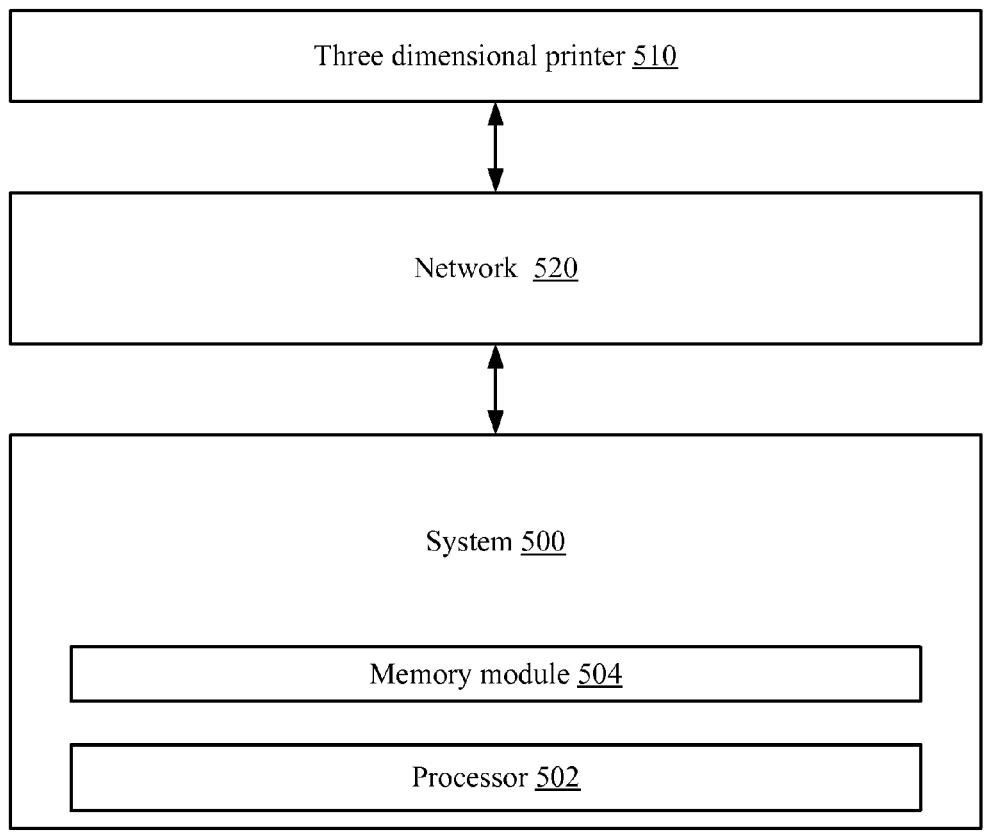
FIG. 14 illustrates a system according to an embodiment of the invention.

FIG. 14 illustrates system 500, three dimensional printer 510 and network 520 according to an embodiment of the invention.

System 500 may include processor 502 and memory module 504. The system 500 may be coupled to a three-dimensional printer 510 via network 520.

The system 500 may be a computer such as a laptop, a desktop, a server, a mobile phone, a personal data assistant, a media player, or any system that may execute programs and communicate with other devices. The system 500 may be directly or indirectly accessed by a user. For example, the system 500 may be a server that can communicate with a user device that differs from system 500. Alternatively, the system may be a user device that includes a man machine interface (keyboard, screen, touch screen, mouse, voice activation interface, and the like). In the latter scenario the user device may be arranged to execute an application that allows the user to benefit from the computerized services of system 500.

The processor 502 may be a general purpose processor, a digital signal processor or a dedicated hardware arranged to perform the processing illustrated in the patent application. The memory module 504 may be arranged to store a first representation of a first three dimensional object and a second representation of a second three dimensional object. The processor may be arranged to calculate first curvature attributes of first areas of a first representation of a first three dimensional object; calculate second curvature attributes of second areas of a second representation of a second three dimensional object; select first points of interest of the first representation in response to the first curvature attributes; select second points of interest of the second representation in response to the second curvature attributes; classify the first points of interest to first classes; classify the second points of interest to second classes; calculate multiple sets of first vectors that are indicative of spatial relationships between first points of interest, wherein different sets out of the multiple sets of the first vectors are associated with different first classes; calculate multiple sets of second vectors that are indicative of spatial relationships between second points of interest, wherein different sets out of the multiple sets of the second vectors are associated with different second classes; determine a misalignment between the first and second representations of the first and second objects in response to relationships between the multiple sets of first vectors and the multiple sets of the second vectors.

Network 520 may be a wired network, wireless network, a combination of wired and wireless networks, a local area network, a wide area network, the Internet and the like.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A non-transitory computer readable medium that stores instructions that once executed by a computer cause the computer to execute the stages of:
    calculating first curvature attributes of first areas of a first representation of a first three dimensional object;
    calculating second curvature attributes of second areas of a second representation of a second three dimensional object;

selecting first points of interest of the first representation in response to the first curvature attributes;
selecting second points of interest of the second representation in response to the second curvature attributes;
classifying the first points of interest to first classes;
classifying the second points of interest to second classes;
calculating multiple sets of first vectors that are indicative of spatial relationships between first points of interest, wherein different sets out of the multiple sets of the first vectors are associated with different first classes;
calculating multiple sets of second vectors that are indicative of spatial relationships between second points of interest, wherein different sets out of the multiple sets of the second vectors are associated with different second classes; and
determining a misalignment between the first and second representations of the first and second objects in response to relationships between the multiple sets of first vectors and the multiple sets of the second vectors.

2. The non-transitory computer readable medium according to claim 1 that stores instructions for compensating for the misalignment between the first and second representations of the first and second objects.

3. The non-transitory computer readable medium according to claim 1 that stores instructions for determining the misalignment by calculating correlations between pairs of first and second vectors that are associated with matching first and second classes.

4. The non-transitory computer readable medium according to claim 1 that stores instructions for repeating, for each pair of first and second vectors that are associated with matching classes of first and second points of interest: mapping the set of first vectors to a first function on a three dimensional rotation group; mapping the set of second vectors to a second function on the three dimensional rotation group; applying a first Fourier transform on the first function to provide a first Fourier transformed function; applying a second Fourier transform on the second function to provide a second Fourier transformed function.

5. The non-transitory computer readable medium according to claim 4 that stores instructions for determining a misalignment between the first and second representations of the first and second objects in response to a misalignment function that is responsive to values of first and second Fourier transformed functions associated with pairs of the first and second vectors that are associated with matching classes of first and second points of interest.

6. The non-transitory computer readable medium according to claim 5 that stores instructions for determining the misalignment by feeding different misalignment values to the misalignment function.

7. The non-transitory computer readable medium according to claim 1 that stores instructions for receiving scale information and wherein the determining a misalignment is responsive to the scale information.

8. The non-transitory computer readable medium according to claim 1 wherein each first vector is indicative of a spatial relationship between two first points of interest.

9. The non-transitory computer readable medium according to claim 1 wherein each first vector is indicative of a spatial relationship between three first points of interest.

10. The non-transitory computer readable medium according to claim 1 wherein the first and second curvature attributes are Jacobi field vectors.

11. A non-transitory computer readable medium that stores instructions that once executed by a computer cause the computer to execute the stages of:
calculating first curvature attributes of first areas of a first representation of a first three dimensional object;
calculating second curvature attributes of second areas of a second representation of a second three dimensional object;
selecting first points of interest of the first representation in response to the first curvature attributes;
selecting second points of interest of the second representation in response to the second curvature attributes;
classifying the first points of interest to first classes and classifying the second points of interest to second classes; wherein each first class has a corresponding second class;
calculating a set of first vectors that are indicative of spatial relationships between first points of interest for each first combination out of a first group of combinations of one or more first classes;
calculating a set of second vectors that are indicative of spatial relationships between second points of interest for each second combination out of a group of second combinations of one or more second classes; wherein each first combination has a corresponding second combination;
for each set of first vectors, calculating a mathematical relationship between the first set of vectors and a corresponding second set of vectors, wherein the first set of vectors is associated with a first group of combinations and the corresponding second set of vectors is associated with a corresponding second group of combinations, thereby providing multiple mathematical relationships; and
determining a misalignment between the first and second representations of the first and second objects in response to the multiple mathematical relationships.

12. The non-transitory computer readable medium according to claim 11 that stores instructions for calculating each of the multiple mathematical relationships by mapping the set of first vectors to a first function on a three dimensional rotation group; mapping the set of second vectors to a second function on the three dimensional rotation group; applying a first Fourier transform on the first function to provide a first Fourier transformed function; applying a second Fourier transform on the second function to provide a second Fourier transformed function.

13. A computer that comprises a memory module and a processor, wherein the processor is arranged to:
calculate first curvature attributes of first areas of a first representation of a first three dimensional object;
calculate second curvature attributes of second areas of a second representation of a second three dimensional object;
select first points of interest of the first representation in response to the first curvature attributes;
select second points of interest of the second representation in response to the second curvature attributes;
classify the first points of interest to first classes;
classify the second points of interest to second classes;
calculate multiple sets of first vectors that are indicative of spatial relationships between first points of interest, wherein different sets out of the multiple sets of the first vectors are associated with different first classes;
calculate multiple sets of second vectors that are indicative of spatial relationships between second points of interest, wherein different sets out of the multiple sets of the second vectors are associated with different second classes; and determine a misalignment between the first and second representations of the first and second objects in response to relationships between the multiple sets of first vectors and the multiple sets of the second vectors.

* * * * *